Patented June 16, 1925.

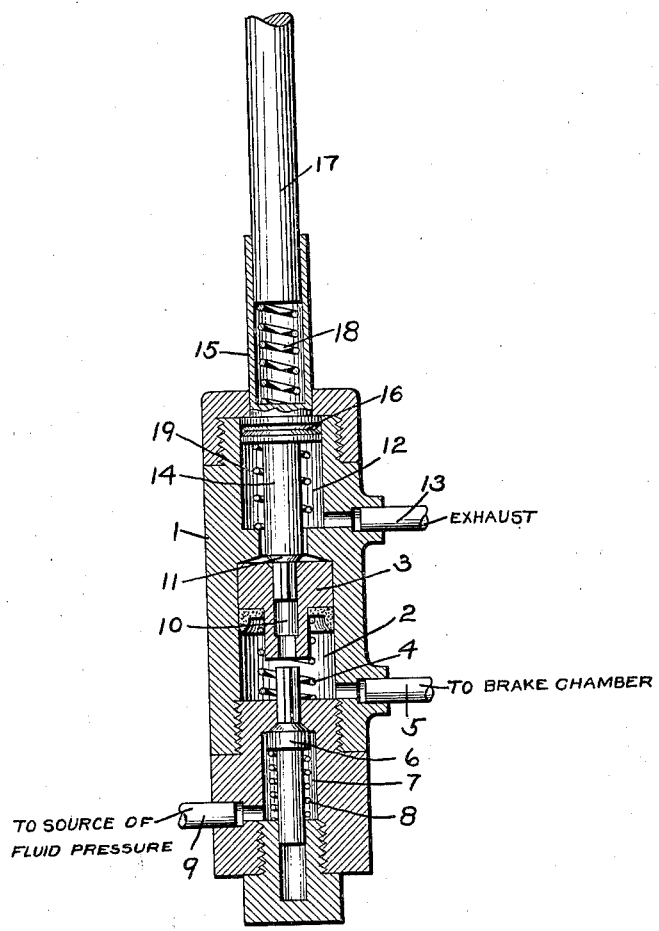

1,541,913

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE-CONTROL VALVE.

Application filed April 11, 1922. Serial No. 551,713.

*To all whom it may concern:*

Be it known that I, JOHN R. BARTHOLOMEW, a citizen of the United States, residing at Berkeley, in the county of Alameda and State of California, have invented new and useful Improvements in Automotive Brake-Control Valves, of which the following is a specification.

This invention relates to automotive fluid pressure brakes, and more particularly to a brake controlling device therefor.

The principal object of my invention is to provide an improved manually operated brake controlling device of the above character.

In the accompanying drawing, the single figure is a central sectional view of a brake controlling device embodying my invention.

It has heretofore been proposed to employ a fluid pressure brake for controlling the brakes on a motor vehicle and with such a brake, it is desirable to provide a controlling device which is promptly responsive to slight movements to effect the application and release of the brakes. According to my invention the above result is accomplished by the operation of application and release valves through the movement of a push rod, the brake cylinder pressure being varied according to the degree of pressure which may be applied to the push rod.

As shown in the drawing, the brake controlling device may comprise a casing 1 having a piston chamber 2 containing a piston 3 subject to the pressure of a coil spring 4. The piston chamber 2 is connected by pipe 5 to the brake cylinder or brake chamber, an increase in pressure in which is adapted to apply the brakes on the motor vehicle.

A supply valve 6, contained in valve chamber 7 and subject to the pressure of a coil spring 8 is adapted to control communication through which fluid under pressure is supplied to the brake chamber to apply the brakes, the valve chamber 7 being connected by pipe 9 to a suitable source of fluid under pressure. The movement of piston 3 in one direction operates to open the valve 6 and the exhaust of fluid from piston chamber 2 and brake cylinder pipe 5 is effected through a central passage 10 in the piston 3, which is controlled by an exhaust valve 11 in valve chamber 12, the valve chamber 12 being connected to an atmospheric exhaust pipe 13.

The exhaust valve 11 is carried by an operating stem 14 having a tubular extension 15 which projects out of the casing, a guide piston 16 working in the valve chamber 12 being provided on the stem 14.

For operating the stem 14, an operating rod 17 is inserted in the tubular extension 15, preferably with a coil spring 18 interposed between the stem and the end of the rod. The rod 17 is adapted to be manually operated, for example, as shown in the co-pending application of Carlton D. Stewart, Serial No. 551,475 filed April 11, 1922.

In operation, when no pressure is applied to the operating rod 17, the stem 14 will be held in the position shown in the drawing by the spring 19 and piston 3 is maintained in the position shown, by spring 4. The valve 11 is therefore unseated, establishing communication from the brake cylinder pipe 5 to the exhaust pipe 13. If it is desired to apply the brakes, pressure is applied to the rod 17, so that the stem 14 is first moved to cause the exhaust valve 11 to seat and cut off the exhaust from the brake chamber, and then the piston 3 is moved so that the stem of the supply valve 6 is actuated to open the valve and admit fluid under pressure to the pipe 5 to effect an application of the brakes.

The pressure of fluid supplied to the brake cylinder acts on the piston 3 and tends to move the piston so as to permit the closing of the supply valve 6.

When the pressure of fluid supplied to the brake cylinder slightly exceeds the pressure applied to the rod 17 the piston 3 will be moved so as to allow the valve 6 to seat and thereby cut off the further supply of fluid to the brake cylinder. If the pressure applied to the rod 17 is increased, the piston 3 will again be moved to open the valve 6 and admit fluid to the brake cylinder until the brake cylinder pressure has been increased to slightly exceed the pressure applied to the rod 17, when the piston 3 will be again operated by brake cylinder pressure to permit the valve 6 to close.

The brakes may be released by relieving the pressure applied to the rod 17, when the valve 11 will be instantly lifted from its seat by the action of spring 19 to permit the exhaust of fluid from the brake chamber through pipe 5 to the exhaust pipe 13. The brakes may be fully released by allowing the valve 11 to remain open or the brakes may be partially released, that is to say the brake cylinder pressure reduced, by first relieving the pressure on the rod 17 to open the valve 11 and then applying pressure to the rod to close the valve 11.

It will now be seen from the foregoing description that the fluid pressure brakes on the motor vehicle may be quickly applied by merely applying pressure to the rod 17 and that the brake cylinder pressure will be proportional to the amount of pressure applied to the rod, while the brakes may be fully or gradually released by merely relieving the pressure applied to the rod 17.

It will be noted that with the above construction the operator can "feel" the brake application, similar to the "feel" of the ordinary foot brake employed on motor vehicles.

While not essential to the operation, a spring 18 may be interposed between the push rod 17 and the hollow stem 15, so that when the hand depresses the rod 17, the spring 18 is compressed and the compression of the spring will determine the pressure at which the inlet valve will close.

Having now described my invention, what I claim as new and desire to secure by Letters Patent, is:—

In an automotive fluid pressure brake, a controlling valve device comprising a valve for controlling the supply of fluid under pressure for applying the brakes, an exhaust valve, a piston intermediate said valves for operating the supply valve, and a manually operated push rod for operating said exhaust valve and piston.

In testimony whereof I have hereunto set my hand.

JOHN R. BARTHOLOMEW.